United States Patent [19]
Blades et al.

[11] Patent Number: 5,420,975
[45] Date of Patent: May 30, 1995

[54] METHOD AND SYSTEM FOR AUTOMATIC ALTERATION OF DISPLAY OF MENU OPTIONS

[75] Inventors: Jerry A. Blades; Harvey G. Kiel, both of Rochester, Minn.

[73] Assignee: International Business Machines Corporation, Armonk, N.Y.

[21] Appl. No.: 997,418

[22] Filed: Dec. 28, 1992

[51] Int. Cl.⁶ .............................................. G06F 3/14
[52] U.S. Cl. ................................................ 395/156
[58] Field of Search .............................. 395/144–149, 395/155, 156, 157–161

[56] References Cited

U.S. PATENT DOCUMENTS

| | | | |
|---|---|---|---|
| 4,688,195 | 8/1987 | Thompson et al. | 395/12 |
| 4,967,190 | 10/1990 | Fujisaki et al. | 345/112 |
| 5,067,103 | 11/1991 | Lapeyre | 364/709.16 |

OTHER PUBLICATIONS

"User Interface Design to Hide Complexity in Dialogs," S. S. Fleming, R. J. Torres, Document No. AAA92A060322, TDB n9 Feb. 1992 pp. 234–236.

"Short/Full Context Menus," R. E. Lee, R. J. Torres, Document No. AAA91A063425, Research Disclosure n332 Dec. 1991.

"User Interface Design to Hide Complexity in Dialogs," S. S. Fleming, R. J. Torres, IBM Technical Disclosure Bulletin, vol. 34, No. 9 Feb., 1992.

"Electronic Equipment," JP 03-109628, 91.05.09.

"Menu Selecting Device," JP 02-121529, 90.05.09.

"Of Mice and Menus: Designing the User-friendly Interface," T. S. Perry, J. Voelcker, IEEE Spect. (USA), vol. 26, No. 9 pp. 46–51, Sep. 1989, 13 REF.

"Flexible Menus with Simple Programming," D. Ludwigs, Pers. Comput. (West Germany), No. 10, pp. 92–96, Oct. 1988, 0 REF.

"MWWIND—A Menu with Windows Utility," D. A. Bronstein, Dept. of Resource Dev., Michigan State Univ., East Lansing, Mich., USA.

"Menu-driven User Interfaces for Videographics," R. G. Shoup, SMPTE J. (USA), vol. 92, No. 11, pp. 1208–1210, Nov. 1983, 0 REF.

"User Interfaces to Information Systems: Choices vs. Commands," V. J. Geller, M. E. Lesk, J. J. Kuehn, ED, ACM, Baltimore, Md., USA 268 pp. 130–135, 1983, 14 REF.

*Primary Examiner*—Mark R. Powell
*Assistant Examiner*—Huynh Ba
*Attorney, Agent, or Firm*—Michael J. Anglin; Lisa L. B. Yociss; Andrew J. Dillon

[57] ABSTRACT

A method and system for the automatic alteration of a display of multiple user selectable menu options. A counter is associated with each user selectable menu option. The counter associated with a user selectable menu option is then incremented in response to each selection by a user of the user selectable menu option. The display of the user selectable menu option is automatically altered in response to a state of the associated counter.

12 Claims, 7 Drawing Sheets

METHOD AND SYSTEM FOR AUTOMATIC ALTERATION OF DISPLAY OF MENU OPTIONS

BACKGROUND OF THE INVENTION

1. Technical Field

The present invention relates in general to a method and system for the automatic alteration of a display of user selectable menu options within a data processing system and in particular to a method and system for the association of a counter with each user selectable menu option within a data processing system. Still more particularly, the present invention relates to a method and system within a data processing system for the incrementing of a counter associated with each user selectable menu option in response to each selection of the menu option by a user.

2. Description of the Related Art

In known computer systems graphic menus are provided which include menu options that a user may select in order to perform various tasks such as creating or opening files, deleting files, or changing the format of a document. A user typically selects a menu by utilizing a mouse or other input device. Once a menu is selected menu options included within that menu are displayed. Often there are more menu options to be displayed than space within a computer display screen to display them. In these situations a portion of the menu options is displayed. The user is permitted to scroll through the options causing different portions of the menu options to be displayed until the user finds the desired menu option.

Some known systems permit a user to delete menu options which are not frequently used from future displays of the menu while others permit a user to predetermine which menu options will be displayed. In some of these systems a usage history is maintained and displayed to the user. A user may also change the display order of menus so that menus which contain more advanced menu options do not appear to the user who is utilizing the basic menu options.

It should therefore be apparent that a need exists for a method and system for automatically altering a display of user selectable menu options without a direct action by a user.

SUMMARY OF THE INVENTION

It is therefore one object of the present invention to provide an improved method and system for the automatic alteration of a display of user selectable menu options within a data processing system.

It is another object of the present invention to provide an improved method and system for the association of a counter with each user selectable menu option within a data processing system.

It is yet another object of the present invention to provide an improved method and system for the incrementing of a counter associated with a user selectable menu option in response to a user selection of the menu option within a data processing system.

The foregoing objects are achieved as is now described. A method and system are provided for the automatic alteration of a display of multiple user selectable menu options. A counter is associated with each user selectable menu option. The counter associated with a user selectable menu option is then incremented in response to each selection by a user of the user selectable menu option. The display of the user selectable menu option is automatically altered in response to a state of the associated counter.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
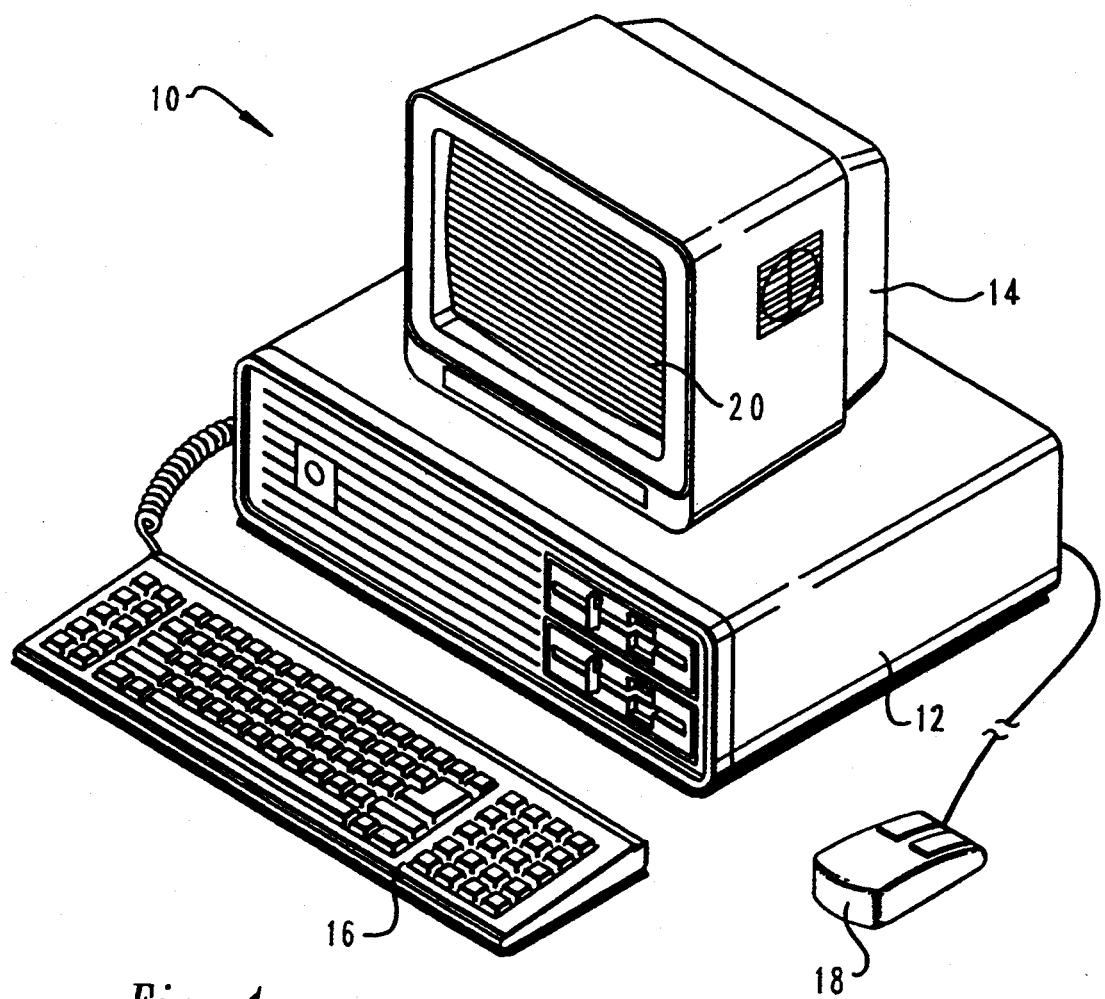
FIG. 1 depicts a pictorial representation of a data processing system which may be utilized to implement the method and system of the present invention.

With reference now to the figures and in particular with reference to FIG. 1, there is depicted a pictorial representation of a data processing system 10 which may be utilized in accordance with the method and system of the present invention. Data processing system 10 preferably includes a processor 12, preferably provided by utilizing an International Business Machines Personal System/2 or similar system. Data processing system 10 generally includes a video display device 14 including a display screen 20, keyboard 16, and a graphical data entry device such as a mouse 18. Video display device 14, keyboard 16, and mouse 18 may be utilized to allow user input to processor 12 and to provide user discernable messages. In a preferred embodiment of the present invention, processor 12 is suitably programmed to provide the automatic alteration of a display of menu options, and to implement the processes set forth in the logic flow chart included herein.

Figure 2:
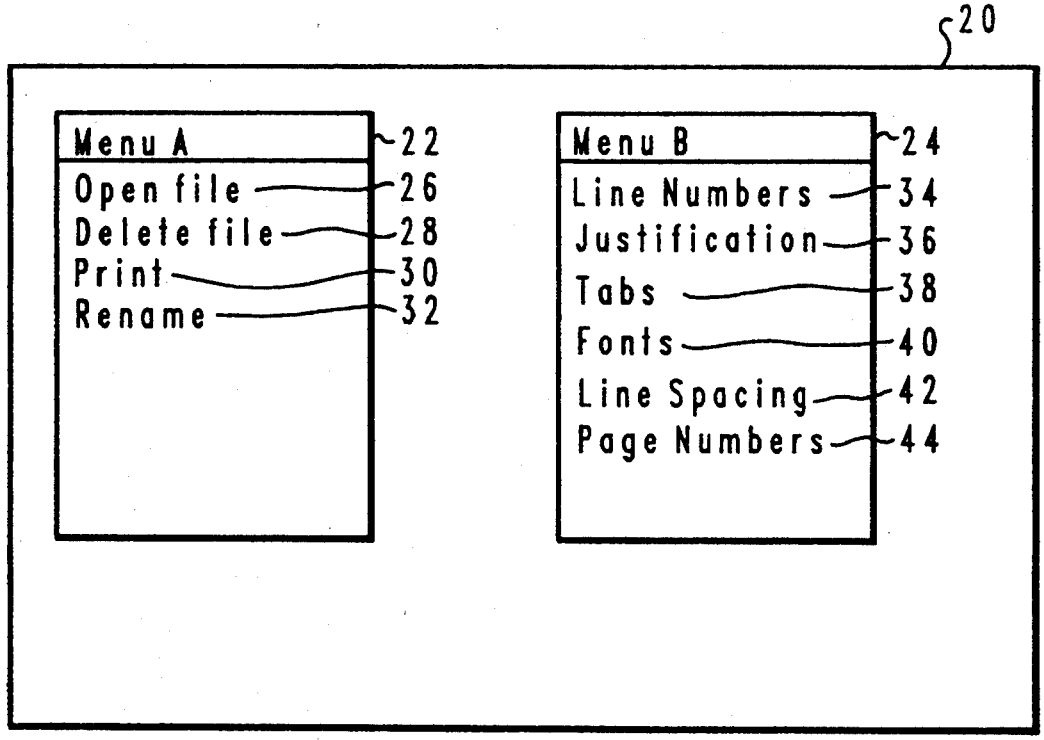
FIGS. 2 and 3 illustrate a display screen and two displayed menus which include user selectable menu options in accordance with the present invention.

Referring to FIG. 2, there is depicted display screen 20 and two displayed menus 22 and 24 which include user selectable menu options 26–44 in accordance with the present invention. A computer application may include multiple menus from which a user may choose in order to complete tasks. For example, a menu 22 of file utilities or menu options such as open 26, delete 28, print 30 or rename 32 may be provided. In addition, a menu 24 of format menu options may be provided such as line numbers 34, justification 36, tabs 38, fonts 40, line spacing 42, and page numbers 44.

For each menu, a counter is provided which counts the number of times a user selects the particular menu. Each time menu 22 is selected, its associated counter is incremented. Each time menu 24 is selected, its associated counter is incremented. A counter is also provided for each menu option within a menu. Each time open file 26 is selected, its associated counter is incremented. Each user has an associated set of counters. Each user has a counter for each menu and each menu option. Therefore, each user will have associated counters for menus 22 and 24 and for menu options 6–44.

A threshold is established for each menu for each user. If the menu option counter divided by the menu counter is less than the established threshold for the particular menu, the display of the menu option associated with the menu option counter is automatically altered. The same threshold may be established for all menus or different thresholds may be established for each user or menu. The display may be altered by deleted the menu option from the menu, dimming the intensity of the display of the menu option, changing the displayed color of the menu option, or any other manner of alteration. All menu options may be altered in the same manner such as by deleting them from the display, or menu options may be altered in a different manner such as by deleting those in one menu while dimming those in a different menu. In this manner, each user selection of a menu option is utilized in order to continuously and automatically update and alter the display without the need for the user to reconfigure the display. To those skilled in the art, it is apparent that when little used menu options are to be deleted, there could be another threshold such as a minimum menu counter threshold. For example, a minimum menu counter threshold could be set to 50 indicating that the menu must be utilized 50 times before options within that menu are deleted. Another approach is to define non-zero initial values for the menu option counter.

Figure 3:
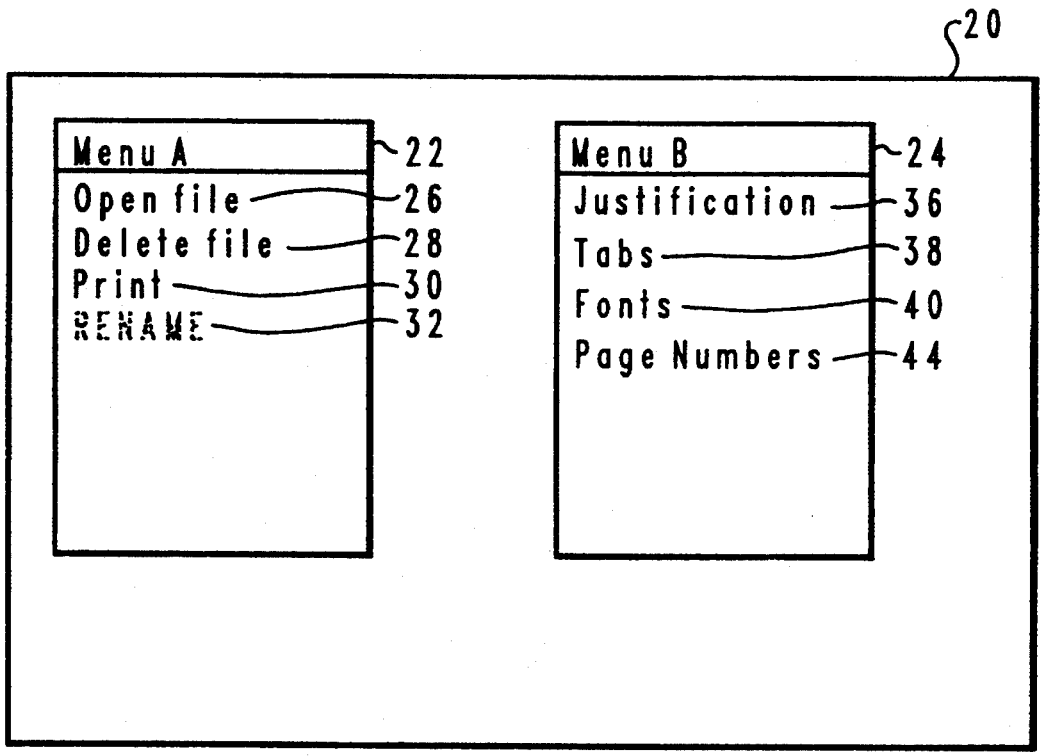
Figure 4A:
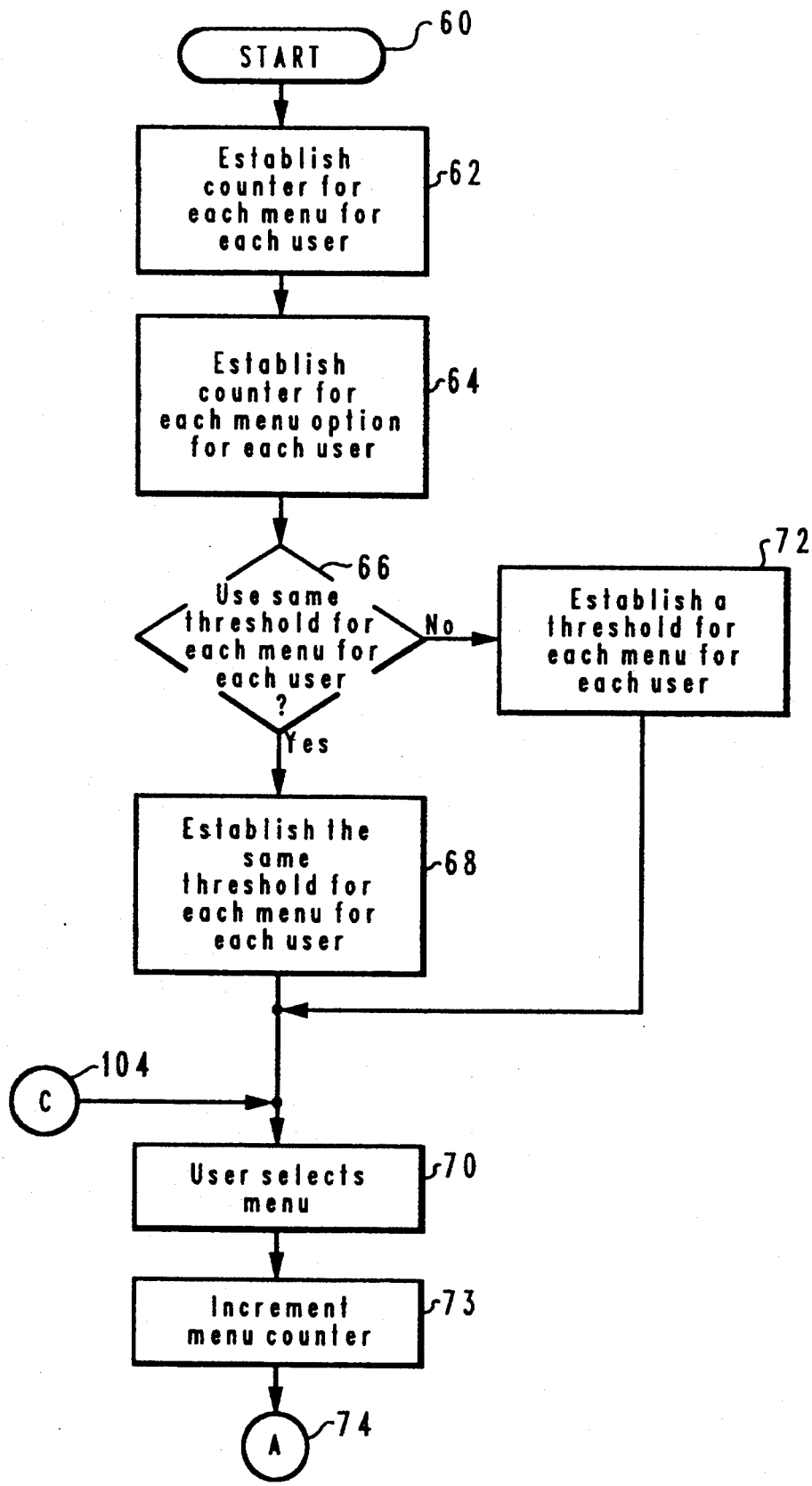
FIGS. 4A–4E together form a high level flow chart which illustrates an automatic alteration of a display of user selectable menu options in accordance with the present invention.
Figure 4B:
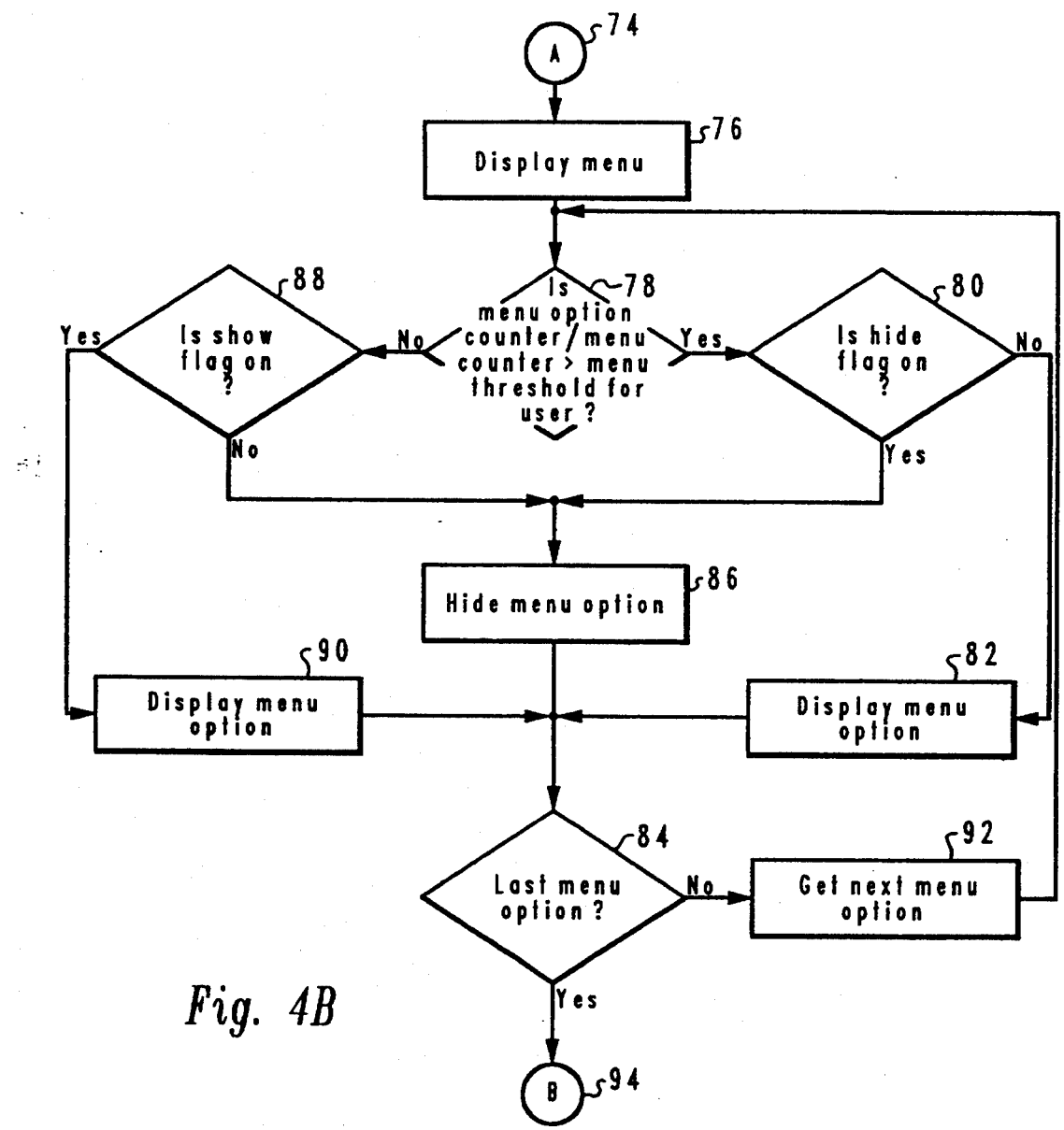
Figure 4C:
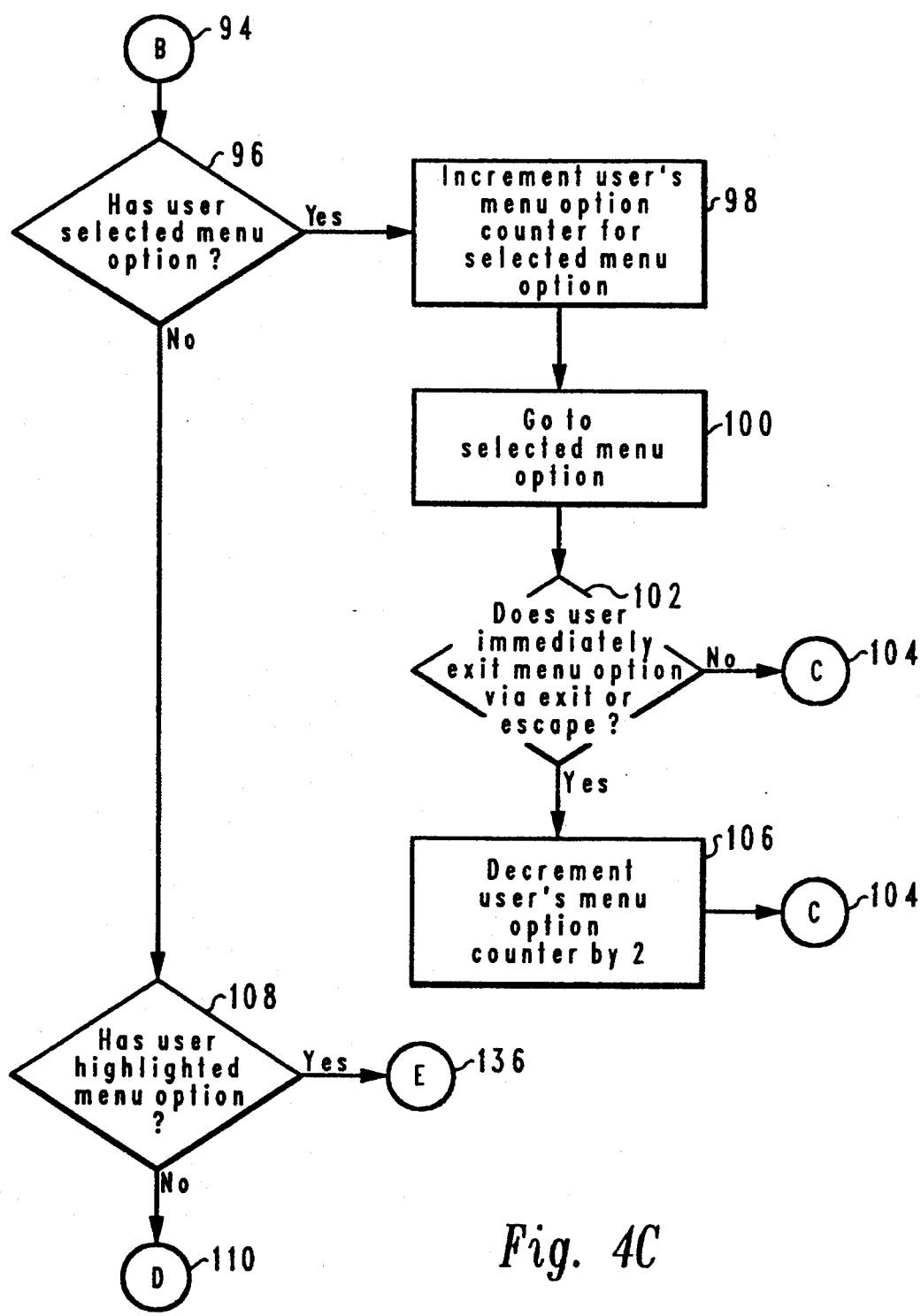
Figure 4D:
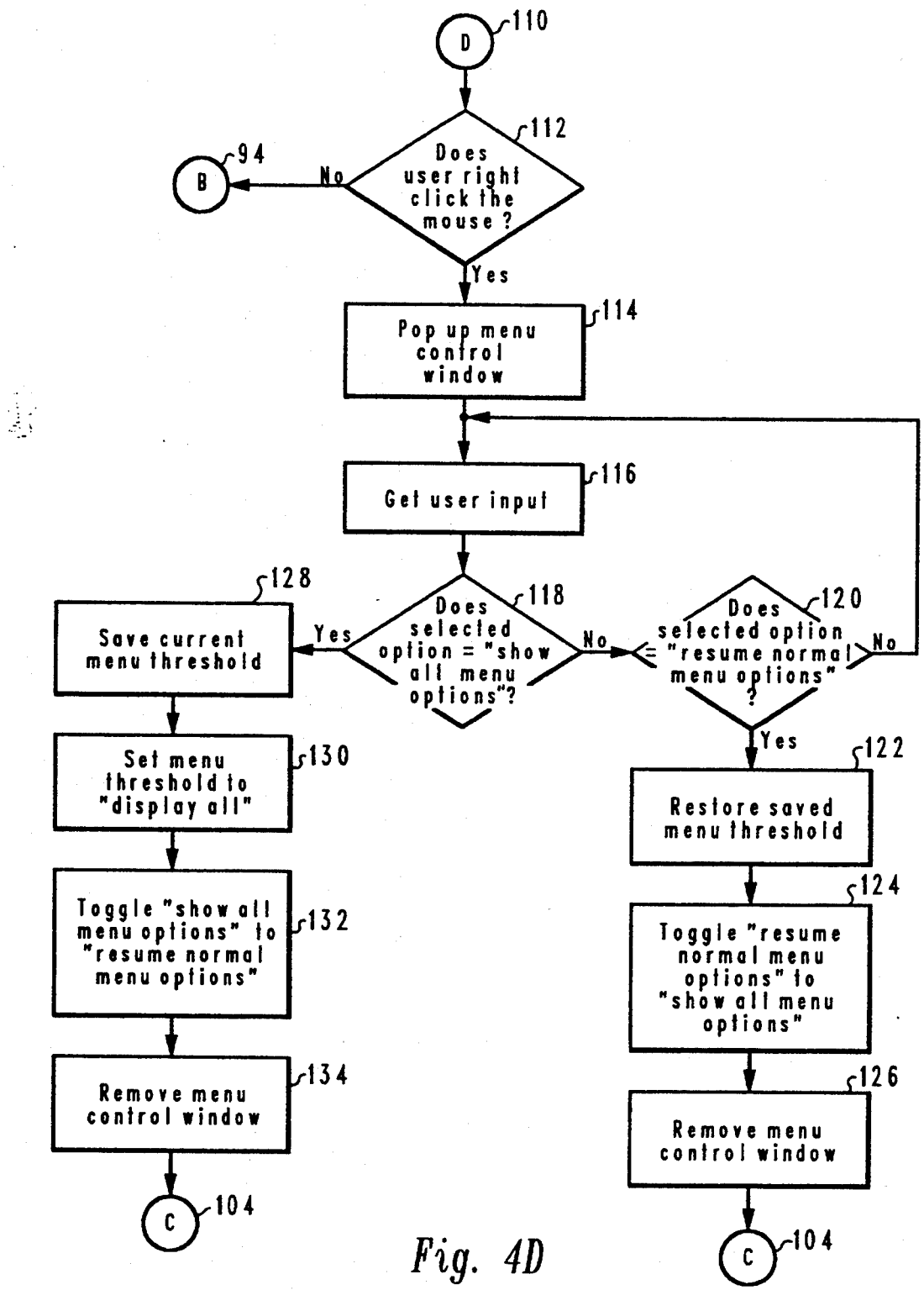
Figure 4E:
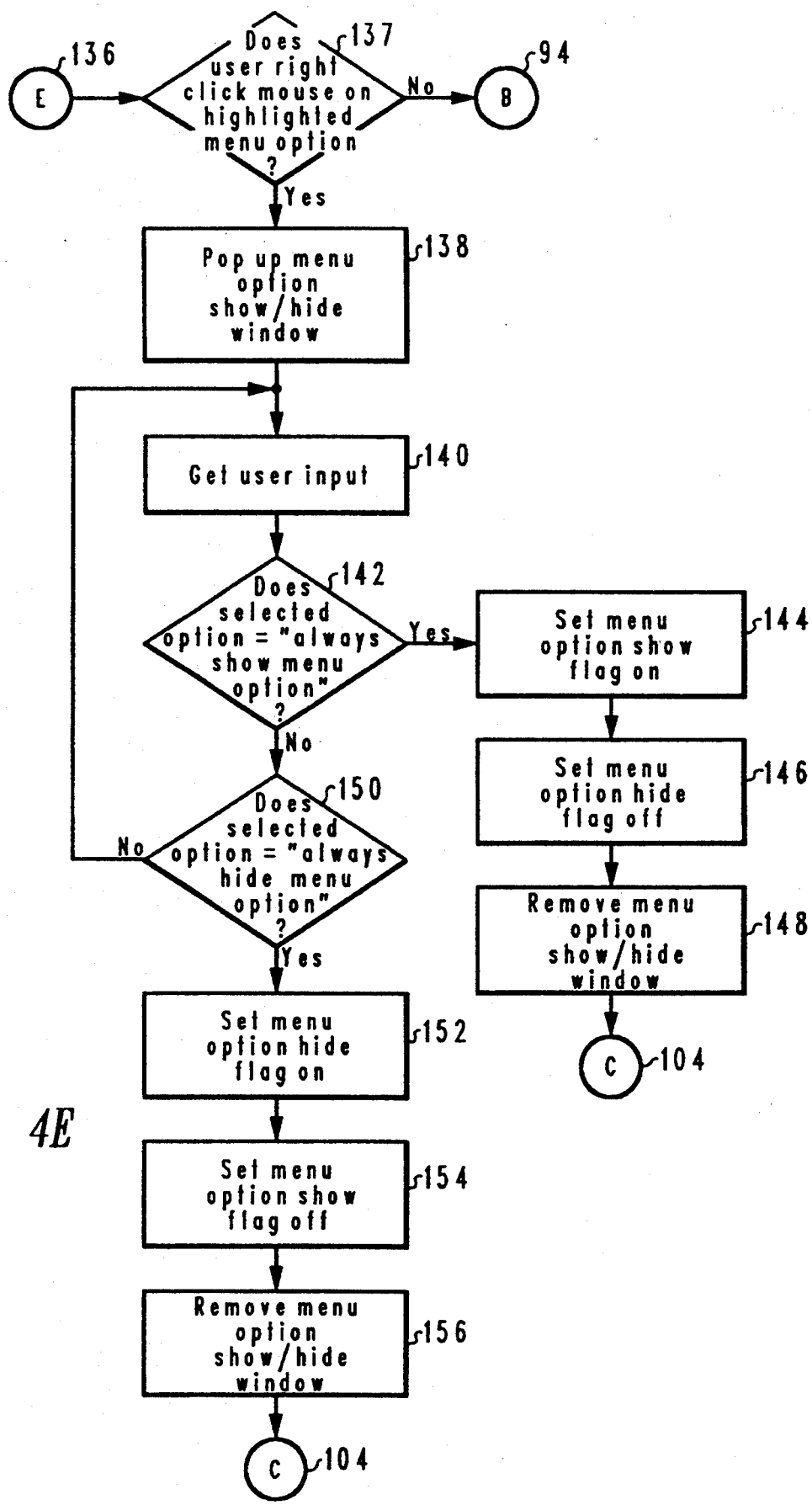

With reference now to FIG. 3, there is depicted display 20 and two displayed menus 22 and 24 which include an automatically altered display of user selectable menu options in accordance with the present invention. A user has utilized menu options within menu 22. Menu options 26, 28, and 30 have been utilized enough times so that the solution of the counters associated with those menu options divided by the counter associated with menu 22 is greater than the established threshold. Therefore, each of these menu options is displayed in an unaltered manner. However, the rename menu option 32 has not been selected enough times and the display is altered by dimming the intensity of the display.

A user has also utilized menu options within menu 24. Menu options 36, 38, 40, and 44 have been utilized enough times so that the solution of the counters associated with those menu options divided by the counter associated with menu 24 is greater than the established threshold. Therefore, each of these menu options is displayed in an unaltered manner. However, the line numbers menu option 34 and the line spacing menu option 42 have not been selected enough times and the display is altered by deleting these menu options from menu 24.

Some menus include menu options as well as submenus. These submenus may also include menu options as well as submenus. Some menus may have common submenus. In these situations there are multiple paths a user may take in order to arrive at the same submenu. It should be appreciated by those skilled in the art that in these situations each common submenu may have its own counter.

Referring now to FIGS. 4A-4E, there is depicted a high level flow chart which illustrates an automatic alteration of a display of user selectable menu options in accordance with the present invention. The process starts as depicted at block 60 and thereafter passes to block 62 which illustrates the establishment of a counter for each menu for each user. For example, the menu counter could be initialized to the number of menu options the menu includes. Next the process passes to block 64 which illustrates the establishment of a counter for each menu option for each user. For example, each menu option counter could be initialized to "1". The process then passes to block 66 which illustrates a determination of whether or not the same threshold for each menu for each user should be utilized. If a determination is made that the same threshold for each menu for each user should be utilized, the process passes to block 68 which illustrates the establishment of the same threshold for each menu for each user. The process thereafter passes to block 70. Referring again to block 66, if a determination is made that the same threshold for each menu for each user should not be utilized, the process passes to block 72 which depicts the establishment of a threshold for each menu for each user. The process then again passes to block 70 which illustrates a user selecting a menu. The process then passes to block 73 which depicts the incrementing of a menu counter for the user. The process next passes to block 76 as illustrated through block 74. Block 76 depicts the displaying of the selected menu.

Thereafter, block 78 illustrates a determination of whether or not a menu option counter divided by the menu counter is greater than the menu threshold for the user. If a determination is made that the menu option counter divided by the menu counter is greater than the menu threshold for the user, the process passes to block 80 which illustrates a determination of whether or not the hide flag is on. If a determination is made that the hide flag is not on, the process passes to block 82 which illustrates the displaying of the menu option. Thereafter, the process passes to block 84. Referring again to block 80, if a determination is made that the hide flag is on, the process passes to block 86 which illustrates the hiding of the menu option. Thereafter, the process again passes to block 84.

Referring again to block 78, if a determination is made that the menu option counter divided by the menu counter is not greater than the menu threshold for the user, the process passes to block 88 which illustrates a determination of whether or not the show flag is on. If a determination is made that the show flag is not on, the process again passes to block 86 which illustrates the hiding of the menu option. Referring again to block 88, if a determination is made that the show flag is on, the process passes to block 90 which depicts the displaying of the menu option. Thereafter, the process again passes to block 84 which illustrates a determination of whether or not this is the last menu option if a determination is made that this is not the last menu option, the process passes to block 92 which depicts the getting of the next menu option. The process then again passes to block 78. Referring again to block 84, if a determination is made that this is the last menu option, the process passes to block 96 as depicted through block 94.

Block 96 illustrates a determination of whether or not the user has selected a menu option. If a determination is made that a user has selected a menu option, the process passes to block 98 which depicts the incrementing of the user's menu option counter for the selected menu option. Thereafter, the process passes to block 100 which illustrates going to the selected menu option. Next the process passes to block 102 which illustrates a determination of whether or not a user immediately exits the menu option utilizing the escape key or exit key. If a determination is made that a user does not immediately exit the menu option utilizing the escape key or exit key, the process passes to block 70 as depicted through block 104. Referring again to block 102, if a determination is made that a user does immediately exit the menu option utilizing the escape key, the process passes to block 106 which illustrates the decrementing of the user's menu option counter by two. It should be apparent that the user's menu option counter may be decremented by any value selected to more quickly remove that menu option from the display. The process then passes to block 70, again as depicted through block 104.

Referring again to block 96, if a determination is made that a user has not selected a menu option, the process passes to block 108 which illustrates a determination of whether or not a user has highlighted a menu option. If a determination is made that a user has not highlighted a menu option, the process passes to block 112 as illustrated through block 110. Block 112 depicts a determination of whether or not a user has clicked the right or middle button of a mouse. If a determination is made that a user has not clicked the right or middle button of a mouse, the process again passes to block 96 as illustrated through block 94. Referring again to block 112, if a determination is made that a user has clicked the right or middle button of a mouse, the process passes to block 114 which illustrates the popping up of a menu control window. Thereafter, the process passes to block 116 which depicts the getting of a user input. Next the process passes to block 118 which illustrates a determination of whether or not a user has selected the option of "showing all menu options." If a determination is made that the selected option is not the "show all menu options," the process passes to block 120 which depicts a determination of whether or not the selected option is the "resume normal menu options." If a determination is made that the selected option is not a "resume normal menu options," the process passes back to block 116.

Referring again to block 120, if a determination is made that the selected option is the "resume normal menu options," the process passes to block 122 which illustrates the restoring of the saved menu thresholds. Thereafter, the process passes to block 124 which depicts the toggling of the "resume normal menu options" to the "show all menu options." Next the process passes to block 126 which depicts the removal of the menu option window. The process thereafter passes to block 70 as illustrated through block 104.

Referring again to block 118, if a determination is made that the selected option is the "show all menu options," the process passes to block 128 which illustrates the saving of the current menu threshold. Thereafter, the process passes to block 130 which depicts the setting of the menu threshold to "display all." In order to display all, the menu threshold could be set to a negative value or a predetermined value indicative of the "display all" mode. Next the process passes to block 132 which illustrates the toggling of the "show all menu options" to the "resume normal menu options." Thereafter, the process passes to block 134 which illustrates the removal of the menu control window. The process then passes to block 70 as illustrated through block 104.

Referring again to block 108, if a determination is made that a user has highlighted a menu option, the process passes to block 137 as illustrated through block 136. Block 137 illustrates a determination of whether or not a user has clicked the right or middle mouse button on a highlighted menu option. If a determination is made that a user has not clicked a right or middle mouse button on a highlighted menu option, the process passes to block 96 as illustrated through block 94. Referring again to block 137, if a determination is made that a user has clicked a right or middle mouse button on a highlighted menu option, the process passes to block 138 which illustrates the popping up of a menu option show/hide window. Next the process passes to block 140 which illustrates the getting of a user input. The process then passes to block 142 which illustrates a determination of whether or not a selected option is the "always show menu option." If a determination is made that a selected option is the "always show menu option," the process passes to block 144 which illustrates the setting of the menu option show flag on. Thereafter, the process passes to block 146 which depicts the setting of the menu option hide flag off. Next, the process passes to block 148 which illustrates the removal of the menu option show/hide window. The process then again passes to block 70 as depicted through block 104.

Referring again to block 142, if a determination is made that the selected option is not the "always show menu option," the process passes to block 150 which depicts the determination of whether or not the selected option is the "always hide menu option." If a determination is made that the selected option is not the "always hide menu option," the process passes again to block 140. Referring again to block 150, if a determination is made that the selected option is the "always hide menu option," the process passes to block 152 which illustrates the setting of the menu option hide flag on. Thereafter, the process passes to block 154 which depicts the setting of the menu option show flag off. The process then passes to block 156 which illustrates the removal of the menu option show/hide window. Thereafter, the process again passes to block 70 as illustrated through block 104.

The "show all" function could be implemented utilizing other methods. For example, an additional push button may be provided with menus where choices have been deleted. The push button could display "show all" if choices have been deleted and then toggled to "hide unused" after the push button has been pressed.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system having a plurality of displayed menus, each of said plurality of displayed menus including a plurality of user selectable menu options for automatically altering a display of said plurality of user selectable menu options, said method comprising the data processing implemented steps of:
   associating a counter with each of said plurality of user selectable menu options;
   incrementing said counter in response to each selection by a user of one of said plurality of user selectable menu options; and
   automatically altering a display of said plurality of user selectable menu options in response to a state of said counter associated with each of said plurality of user selectable menu options by deleting at least one of said plurality of user selectable menu options.

2. The method in a data processing system having a plurality of displayed menus, each of said plurality of displayed menus including a plurality of user selectable menu options for automatically altering a display of said plurality of user selectable menu options according to claim 1 wherein said step of automatically altering a display further includes the step of automatically altering a display color of each of said plurality of user selectable menu options in response to a state of said counter associated with each of said plurality of user selectable menu options.

3. The method in a data processing system having a plurality of displayed menus, each of said plurality of displayed menus including a plurality of user selectable menu options for automatically altering a display of said plurality of user selectable menu options according to claim 1 wherein said step of automatically altering a display further includes the step of automatically dimming the display intensity of each of said plurality of user selectable menu options in response to a state of said counter associated with each of said plurality of user selectable menu options.

4. The method in a data processing system having a plurality of displayed menus, each of said plurality of displayed menus including a plurality of user selectable menu options for automatically altering a display of said plurality of user selectable menu options according to claim 1 further comprising the step of restoring said altered display of each of said plurality of user selectable menu options to an original display of each of said plurality of user selectable menu options in response to a user selection.

5. The method in a data processing system having a plurality of displayed menus, each of said plurality of displayed menus including a plurality of user selectable menu options for automatically altering a display of said plurality of user selectable menu options according to claim 1 further comprising the step of decrementing said counter in response to each deselection by a user of said one of said plurality of user selectable menu options immediately following said selection of said one of said plurality of user selectable menu options.

6. The method in a data processing system having a plurality of displayed menus, each of said plurality of displayed menus including a plurality of user selectable menu options for automatically altering a display of said plurality of user selectable menu options according to claim 1 further comprising the steps of:
associating a second counter with each displayed menu; and
incrementing said second counter in response to each selection by a user of said each displayed menu.

7. A data processing system having a plurality of displayed menus, each of said plurality of displayed menus including a plurality of user selectable menu options for automatically altering a display of said plurality of user selectable menu options, comprising:
means for associating a counter with each of said plurality of user selectable menu options;
means for incrementing said counter in response to each selection by a user of one of said plurality of user selectable menu options; and
means for automatically altering a display of said plurality of user selectable menu options in response to a state of said counter associated with each of said plurality of user selectable menu options by deleting at least one of said plurality of user selectable menu option.

8. The data processing system having a plurality of displayed menus, each of said plurality of displayed menus including a plurality of user selectable menu options for automatically altering a display of said plurality of user selectable menu options according to claim 7 wherein said means for automatically altering a display further includes means for automatically altering a display color of each of said plurality of user selectable menu options in response to a state of said counter associated with each of said plurality of user selectable menu options.

9. The data processing system having a plurality of displayed menus, each of said plurality of displayed menus including a plurality of user selectable menu options for automatically altering a display of said plurality of user selectable menu options according to claim 7 wherein said means for automatically altering a display further includes means for automatically dimming the display intensity of each of said plurality of user selectable menu options in response to a state of said counter associated with each of said plurality of user selectable menu options.

10. The data processing system having a plurality of displayed menus, each of said plurality of displayed menus including a plurality of user selectable menu options for automatically altering a display of said plurality of user selectable menu options according to claim 7 further comprising means for restoring said altered display of each of said plurality of user selectable menu options to an original display of each of said plurality of user selectable menu options in response to a user selection.

11. The data processing system having a plurality of displayed menus, each of said plurality of displayed menus including a plurality of user selectable menu options for automatically altering a display of said plurality of user selectable menu options according to claim 7 further comprising means for decrementing said counter in response to each deselection by a user of said one of said plurality of user selectable menu options immediately following said selection of said one of said plurality of user selectable menu options.

12. The data processing system having a plurality of displayed menus, each of said plurality of displayed menus including a plurality of user selectable menu options for automatically altering a display of said plurality of user selectable menu options according to claim 7 further comprising:
means for associating a second counter with each displayed menu; and
means for incrementing said second counter in response to each selection by a user of said each displayed menu.

* * * * *

UNITED STATES PATENT AND TRADEMARK OFFICE
CERTIFICATE OF CORRECTION

PATENT NO. : 5,420,975
DATED : May 30, 1995
INVENTOR(S) : Blades et al.

It is certified that error appears in the above-indentified patent and that said Letters Patent is hereby corrected as shown below:

--Column 2, line 68-- change "6-44" to --26-44--;

--Column 4, line 49-- change "option if" to --option. If--;

--Column 8, line 6-- change "menu option." to --menu options.--

Signed and Sealed this

Twelfth Day of March, 1996

Attest:

BRUCE LEHMAN

Attesting Officer

Commissioner of Patents and Trademarks